(12) United States Patent
Chen

(10) Patent No.: US 9,908,232 B2
(45) Date of Patent: Mar. 6, 2018

(54) TORSION OUTPUT TOOL

(71) Applicant: CHERVON INTELLECTUAL PROPERTY LIMITED, Road Town (VG)

(72) Inventor: Cuihua Chen, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 425 days.

(21) Appl. No.: 14/750,230

(22) Filed: Jun. 25, 2015

(65) Prior Publication Data
US 2015/0375387 A1 Dec. 31, 2015

(30) Foreign Application Priority Data

| Jun. 30, 2014 | (CN) | 2014 1 0308074 |
| Jun. 30, 2014 | (CN) | 2014 1 0308075 |
| Jun. 30, 2014 | (CN) | 2014 2 0358476 U |
| Jun. 30, 2014 | (CN) | 2014 2 0359423 U |

(51) Int. Cl.
| *B25F 5/00* | (2006.01) |
| *B25B 21/02* | (2006.01) |
| *B25B 23/14* | (2006.01) |
| *F16H 1/28* | (2006.01) |
| *F16H 1/46* | (2006.01) |
| *B25B 23/147* | (2006.01) |

(52) U.S. Cl.
CPC .............. *B25F 5/001* (2013.01); *B25B 21/02* (2013.01); *B25B 21/026* (2013.01); *B25B 23/1475* (2013.01); *F16H 1/28* (2013.01); *F16H 1/46* (2013.01)

(58) Field of Classification Search
CPC ....... B25B 21/00; B25B 21/02; B25B 21/026; B25F 5/001
USPC ............................................... 173/29, 47, 48
See application file for complete search history.

(56) References Cited

U.S. PATENT DOCUMENTS

| 6,457,535 | B1 * | 10/2002 | Tanaka | B25B 21/00 173/178 |
| 7,124,839 | B2 * | 10/2006 | Furuta | B25B 21/00 173/104 |
| 8,794,348 | B2 * | 8/2014 | Rudolph | B25B 21/00 173/109 |
| 9,216,504 | B2 * | 12/2015 | Zhang | B25F 5/001 |
| 9,415,498 | B2 * | 8/2016 | Hecht | B25D 11/062 |

(Continued)

*Primary Examiner* — Andrew M Tecco
*Assistant Examiner* — Praachi M Pathak
(74) *Attorney, Agent, or Firm* — Greenberg Traurig, LLP

(57) ABSTRACT

A torsion output tool has a housing, a motor and a transmission assembly. The transmission assembly includes a first planetary gear train. The first planetary gear train has a first planetary gear carrier, a first level planetary gear, a first inner ring gear disposed outside the first level planetary gear and meshing therewith, and a first central wheel sliding in a direction of a first axis to a first position and a second position. The transmission assembly further has a locking member. The locking member slides synchronously with the first central wheel and only locks the relative circumferential positions of the output shaft and the first planetary gear carrier when the first central wheel is at the first position and only constitutes circumferential engagement with the first planetary gear carrier when the first central wheel is at the second position to achieve a drilling mode and an impact mode of operation for the tool.

18 Claims, 10 Drawing Sheets

(56) References Cited

U.S. PATENT DOCUMENTS

| | | | |
|---|---|---|---|
| 2006/0090913 A1* | 5/2006 | Furuta | B25B 21/00 173/48 |
| 2006/0237205 A1* | 10/2006 | Sia | B25B 21/00 173/48 |
| 2007/0056756 A1* | 3/2007 | Chung | B25B 21/00 173/48 |
| 2009/0151966 A1* | 6/2009 | Chen | B25B 21/00 173/48 |
| 2010/0186978 A1* | 7/2010 | Sekino | B23B 45/008 173/48 |
| 2010/0319945 A1* | 12/2010 | Chen | B23B 45/008 173/48 |

* cited by examiner

TORSION OUTPUT TOOL

RELATED APPLICATION INFORMATION

This application claims the benefit of CN 201410308075.6, filed on Jun. 30, 2014, CN 201420358476.8, filed on Jun. 30, 2014, CN 201410308074.1, filed on Jun. 30, 2014, and CN 201420359423.8, filed on Jun. 30, 2014, the disclosures of which are incorporated herein by reference in their entirety.

BACKGROUND

The following generally relates to a torsion output tool and, more specifically, to a multi-mode torsion output tool.

An electrical tool that operates continuously, so that the electrical tool is used as an electrical drill, and an electrical tool that operates to impact intermittently, so that the electrical tool is used as a screw driver, are generally known in the art. When an operator needs to switch between drilling and screwing frequently, the operator needs to change electrical tools frequently, which not only causes reduction of operation efficiency, but also seriously affects an operating life of the electrical tools. In view of the above, a need exists for an electrical tool which can be used either as an electrical drill or a screw driver through a simple switching operation.

SUMMARY

The following generally describes a torsion output tool having a housing, a transmission assembly, and a motor for driving the transmission assembly. The transmission assembly includes an output shaft rotatable about a first axis, a hammer body configured to move in a reciprocating manner in the direction of the first axis while rotating about the first axis, a main shaft for driving the hammer body about the first axis, a first planetary gear train for driving the main shaft, and a locking shaft. The output shaft includes a pair of hammer anvils and the hammer body is provided with hammer blocks that cooperate with the hammer anvils while the first planetary gear train includes a first planetary gear carrier rotatably disposed in the housing, a first level planetary gear rotatable relative to the first planetary gear carrier, a first inner ring gear disposed outside the first level planetary gear and meshing with the first level planetary gear, and a first central wheel adapted to slide in the direction of the first axis to a first position and a second position. The first planetary gear carrier rotates synchronously with the main shaft and the first planetary gear carrier, the first level planetary gear, and the first inner ring gear are fixedly positioned in the direction of the first axis relative to each other. The first planetary gear carrier is provided with a slide hole in which an inner circumferential structure is disposed and the first inner ring gear has at least a transmission position in the circumferential direction where the first inner ring gear is stationary relative to the housing so that the first planetary gear carrier rotates relative to the housing. The first central wheel includes a first central gear meshing with the first level planetary gear when the first central wheel is at the first position and an outer circumferential structure extending into the slide hole and mating with the inner circumferential structure when the first central wheel is at the second position. A locking member is arranged to slide synchronously with the first central wheel and rotate synchronously with the first planetary gear carrier. In this manner, when the first central wheel is at the first position, the locking member locks the relative circumferential positions of the output shaft and the first planetary gear carrier and when the first central wheel is at the second position, the locking member unlocks the relative circumferential positions of the output shaft and the first planetary gear carrier.

DETAILED DESCRIPTION

Figure 1:
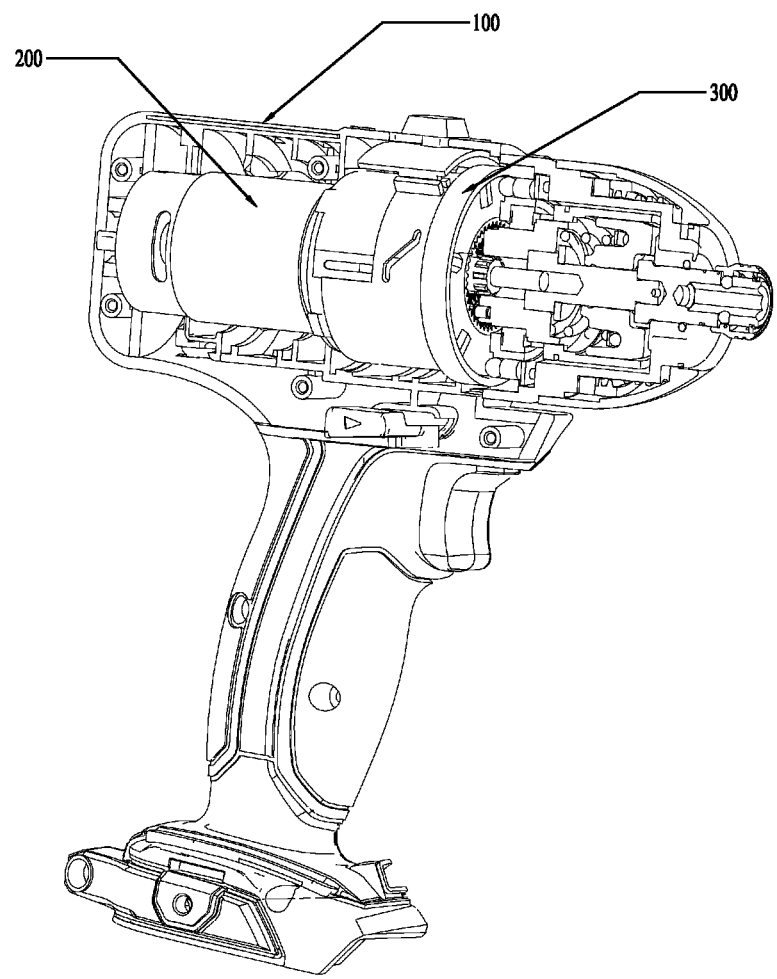
FIG. 1 is a structural schematic view of an exemplary torsion output tool constructed according to the description which follows.
Figure 2:
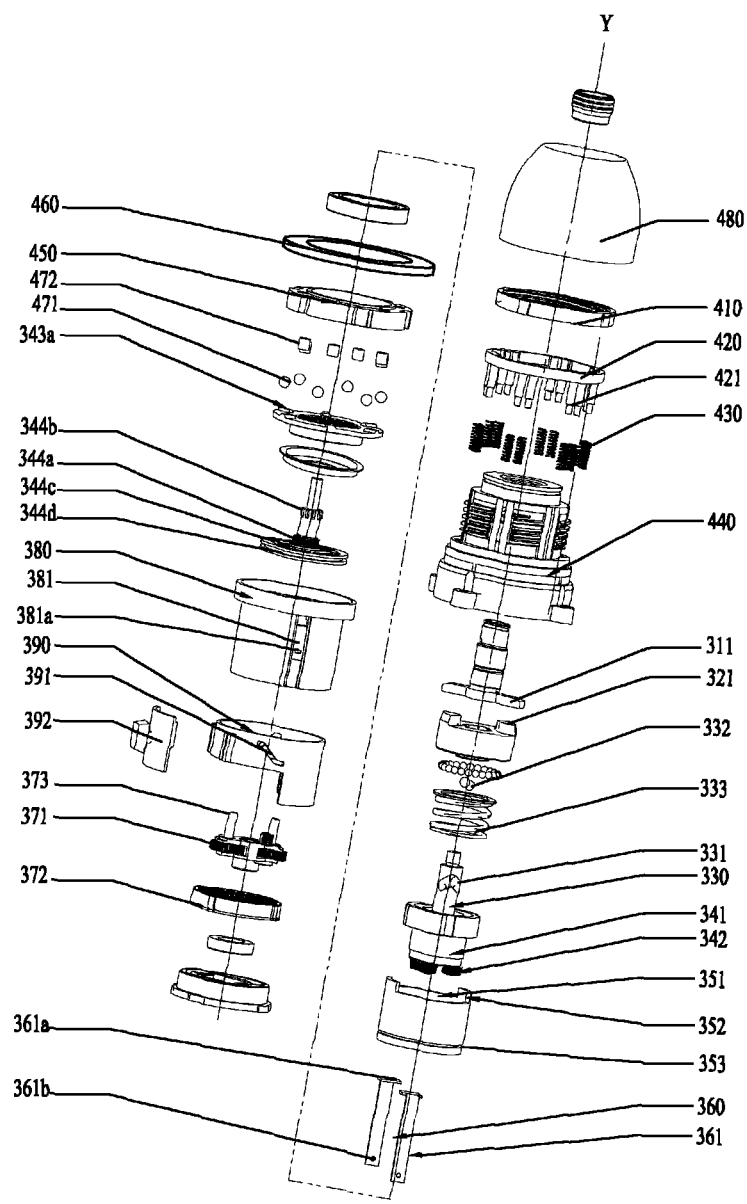
FIG. 2 is an exploded view of a part of the tool of FIG. 1.

An exemplary torsion is shown in FIG. 1 and comprises a housing 100, a motor 200 and a transmission assembly 300, wherein the housing 100 forms a receiving space for receiving the motor 200 and the transmission assembly 300, and the motor 200 is disposed in the receiving space formed by the housing 100 and configured to provide the torsion output tool with desired power upon operation. The transmission assembly 300 is driven by the motor 200 and is configured to output power generated by the motor 200.

Referring to FIGS. 1 through 6 simultaneously, the transmission assembly 300 comprises an output shaft 310, a hammer body 320, a main shaft 330, a first planetary gear train, a locking member 350, a linkage assembly 360 and a second planetary gear train.

Specifically, the output shaft 310 is used to output a torque, with one end connected with various drill bits to adapt for different demands. In the illustrated embodiment, the other end of the output shaft 310 opposite to the end connected to the drill bit is provided with a pair of hammer anvils 311. The output shaft 310 may rotate about an axis on which its own center falls, and the axis of the output shaft 310 on which its own center falls is defined here as a first axis, namely axis Y in FIGS. 2 through 4. A circumferential direction about the first axis is a circumferential direction, a direction facing towards the end of the output shaft 310 connected with the drill bit is defined as the front, and a direction facing towards the other end of the output shaft 310 provided with the hammer anvils 311 is defined as the rear. The front and rear as stated here are only intended to facilitate a clear description of the technical solution of the described embodiment and should not be regarded as limiting the scope of the invention hereinafter claimed.

The hammer body 320 is disposed proximate to the end of the output shaft 310 provided with the hammer anvils 311, and a front end of the hammer body 320 is provided with a pair of hammer blocks 321 that cooperate with the hammer anvils 311 on the output shaft 310. An interior of the hammer body 320 is further provided with a through hole through which the main shaft 330 passes. The main shaft 330 and the hammer body 320 are respectively provided with two segments of semi-spherical slots 331, and between the semi-spherical slots 331 is provided a ball 332 freely slideable therein. A segment of spring 333 is disposed between the main shaft 330 and the hammer body 320. Due to the cooperative action of the semi-spherical slots 331, the ball 332 and the spring 333, the main shaft 330 drives the hammer body 320 to move in a reciprocating manner along the first axis while rotating about the first axis so as to drive the output shaft 310 in an impact manner. How the semi-spherical slots 331, the ball 332 and the spring 333 cooperate to enable the main shaft 330 to drive the hammer body 320 to drive the output shaft 310 in an impact manner is well known in the art and, as such, need not be further described herein.

Figure 3:
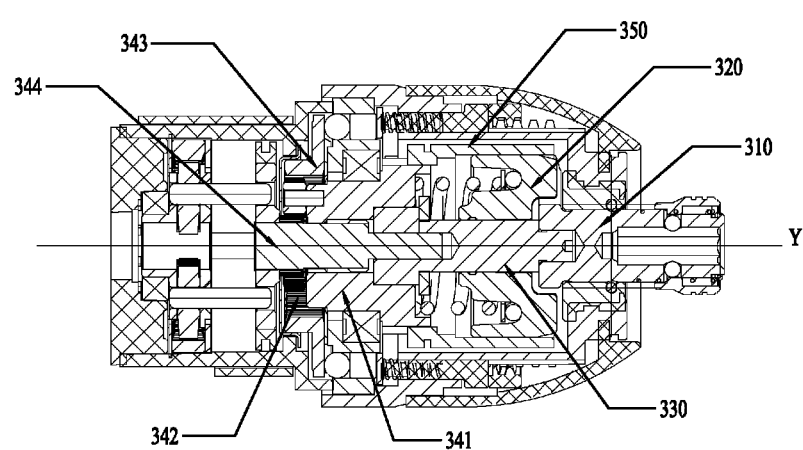
FIG. 3 is a sectional view of a part of the tool of FIG. 1, wherein a first central wheel is at a first position.
Figure 4:
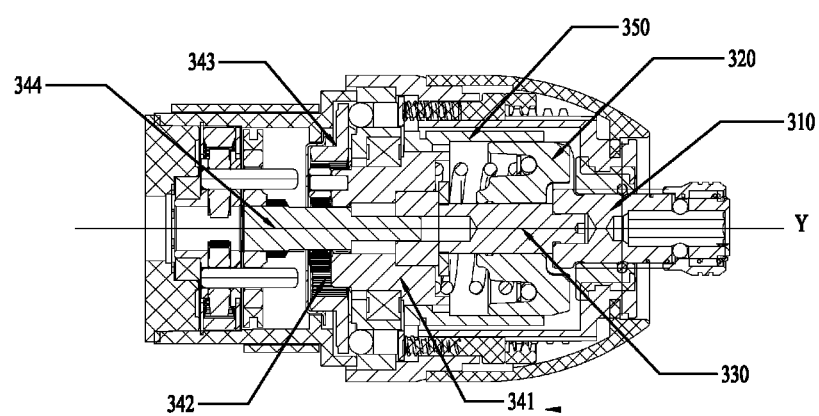
FIG. 4 is a sectional view of a part of the tool of FIG. 1, wherein a first central wheel is at a second position.
Figure 5:
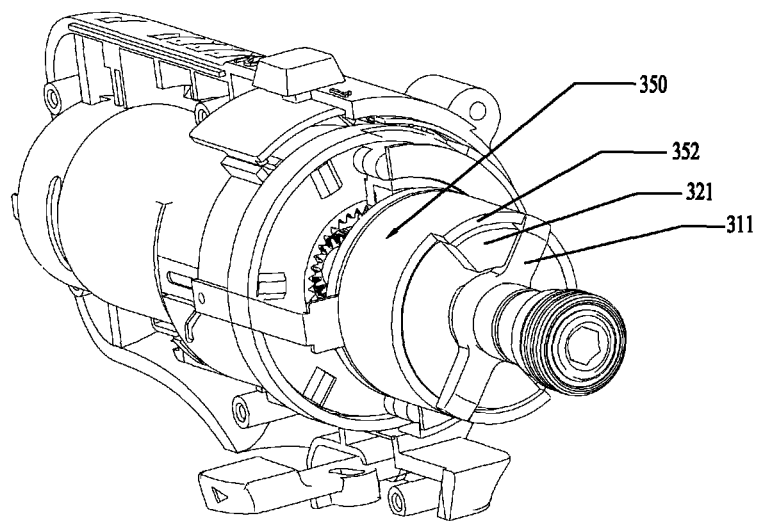
FIG. 5 is a perspective view of a part of the tool of FIG. 1, wherein a first central wheel is at a first position.
Figure 6:
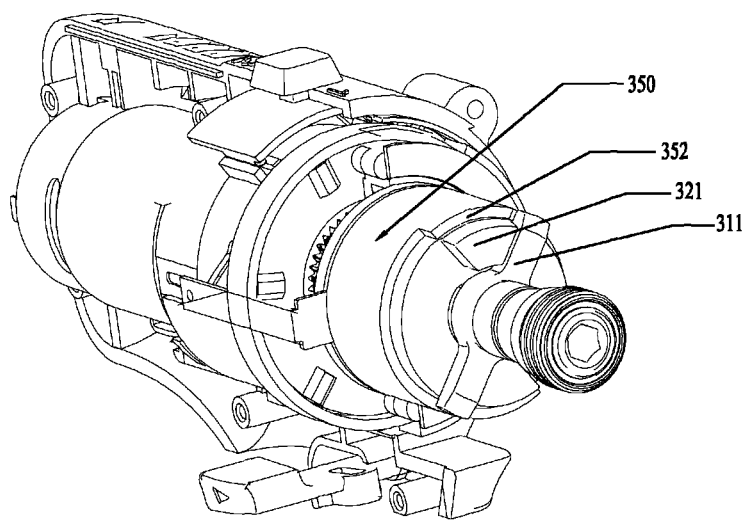
FIG. 6 is a perspective view of a part of the tool of FIG. 1, wherein a first central wheel is at a second position.

The first planetary gear train comprises a first planetary gear carrier 341, a first level planetary gear 342, a first inner ring gear 343 and a first central wheel 344, and the relative positions of the first planetary gear carrier 341, the first level planetary gear 342 and the first inner ring gear 343 in the direction of the first axis are fixed. The first central wheel 344 can slide in the direction of the first axis to a first position and a second position, i.e., the first planetary gear carrier 341, the first level planetary gear 342 and the first inner ring gear 343 cannot slide in the direction of the first axis whereas the first central wheel 344 may slide in the direction of the first axis. The first position here is a position where the first central wheel 344 in FIG. 3 is located, and the second position is a position where the first central wheel 344 in FIG. 4 is located.

The first planetary gear carrier 341 is rotatably disposed in the housing 100 and is fixed with the main shaft 330 to achieve constant synchronous rotation with the main shaft 330. The first planetary gear carrier 341 may thus be press fit into mating engagement with the main shaft 330, for example, by providing a magnitude of interference between the first planetary gear carrier 341 and the main shaft 330 such that they are mated into one piece by means of interference fitting. Certainly, it may be appreciated that the first planetary gear carrier 341 and the main shaft 330 may also be connected by a connector, and connection manners that can achieve constant synchronous rotation are all intended to fall within the protection scope of the claims presented hereinafter. A slide hole is disposed in an interior of the first planetary gear carrier 341, and an inner circumferential structure is disposed in an interior of the slide hole. The inner circumferential structure enables the first central wheel 344 to engage with the first planetary gear carrier 341 and enables the first planetary gear carrier 341 to rotate synchronously with the first central wheel 344 upon engagement.

In the illustrated embodiment, the first planetary gear train comprises a plurality of first level planetary gears 342 which are rotatably connected to a rear end of the first planetary gear carrier 341. The inner ring gear 343 is disposed outside the plurality of first level planetary gears 342 and forms meshed engagement with the first level planetary gears 342. The first inner ring gear 343 is further circumferentially provided with a transmission position that is stationary relative to the housing 100, and the first planetary gear carrier 341 can be allowed to rotate relative to the housing 100 when the first inner ring gear 343 is stationary.

The first central wheel 344 comprises a first central gear 344a, an outer circumferential structure 344b and a wheel disc 344c. The first central gear 344a is disposed at a rear end of the first central wheel 344. When the first central wheel 344 is located at the first position as shown in FIG. 3, the first central gear 344a at the rear end thereof will move to the first level planetary gear 342 and meshes with the first level planetary gear 342 while the outer circumferential structure 344b is disposed at an outer circumference of the first central wheel 344 and is located at a relatively forward position relative to the position of the first central gear 344a on the first central wheel 344. As such, when the first central wheel 344 is located at the second position as shown in FIG. 4, the front end of the first central wheel 344 slides into the slide hole in the first planetary gear carrier 341, and the outer circumferential structure 344b of the first central wheel 344 moves to the location of the inner circumferential structure in the interior of the slide hole and forms an engagement with the inner circumferential structure to drive the first planetary gear carrier 341 to rotate along with the first central wheel 344. In the illustrated embodiment, the inner circumferential structure and the outer circumferential structure 344b are mutually engageable splines. Certainly, other engagement manners may be employed to achieve rotation of the first planetary gear carrier 341 along with the first central wheel 344. The wheel disc 344c is disposed at the end of the first central wheel 344 provided with the first central gear 344a.

An interior of the locking member 350 is formed with a sleeve structure 351 for receiving the hammer body 320. A locking protrusion 352 protruding forward in the direction of the first axis is disposed at a front end of the sleeve structure 351 and a rear end of the interior of the sleeve structure 351 forms an inner slide rail structure extending in the direction of the first axis, and correspondingly, an outer slide rail structure engaging with the inner slide rail is formed on an outer circumference of the first planetary gear carrier 341. In the illustrated embodiment, the inner slide rail structure is a guide block disposed in the interior of the sleeve structure 351 and protruding inwardly, and the outer slide rail structure is a guide slot disposed on an outer periphery of the first planetary gear carrier 341 and extending inwardly. The engagement of the inner slide rail structure and the outer slide rail structure can not only enable the locking member 350 and the first planetary gear carrier 341 to constitute sliding connection in the direction of the first axis to guide and slide the locking member 350, but also can enable the locking member 350 and the planetary gear carrier 341 to rotate synchronously and constantly to achieve torque transmission.

The locking member 351 further slides in the direction of the first axis synchronously with the first central wheel 344, i.e., when the first central wheel 344 is at the first position shown in FIG. 3, the locking member 350 is located at the position of the locking member 350 as shown in FIG. 3, and when the first central wheel 344 is located at the second position as shown in FIG. 4, the locking member 350 is located at the position of the locking member 350 as shown in FIG. 4. When the locking member 350 is located at the position as shown in FIG. 3, the locking protrusion 352 of the locking member 350 extends forward to a position between the hammer anvils 311 of the output shaft 310, whereupon the locking member 350 only locks the relative circumferential positions of the output shaft 310 and the first planetary gear carrier 341 so that the output shaft 310 may rotate about the first axis along with the locking member 350 and also along with the first planetary gear carrier 341 so as to achieve a drilling mode of the torsion output tool. When the locking member 350 is located at the position as shown in FIG. 4, the locking member 350 only forms a circumferential engagement with the first planetary gear carrier 341 without locking the output shaft 310, whereupon the main shaft 330 connected with the first planetary gear carrier 341 drives the hammer body 320 to move reciprocally in the direction of the first axis while rotating about its own axis so that the hammer body 320 rotating about its own axis and moving reciprocally in the direction of the first axis may intermittently impact the output shaft 310 so as to achieve an impact mode of the torsion output tool. Noticeably here, when the locking member 350 is located at the position as shown in FIG. 4, it cannot lock the output shaft 310, but it still a can rotate synchronously with the first planter gear carrier 341 as it is located at the position as shown in FIG. 3.

The linkage assembly 360 is disposed between the locking member 350 and the first central wheel 344 and it can enable the locking member 350 to move in unison with the first central wheel 344 in the direction of the first axis so as to allow the locking member 350 to slide synchronously along with the first central wheel 344 in the direction of the first axis. Specifically, the linkage assembly 360 comprises two links 361, and a front end of each link 361 is bent inwardly to form a stopper 361a. In order to achieve linkage, an outer annular slot 353 in which the stopper 361a is partially embedded is provided at the outer periphery of the locking member 350.

The second planetary gear train is disposed between the motor 200 and the first central wheel 344. The second planetary gear train comprises a second central gear, a second level planetary gear 371, a second inner ring gear 372 and a second level wheel axle 373. The second central gear is mounted on a rotation shaft disposed on the motor 200, the second level planetary gear 371 and the second central gear form meshed engagement, and the second inner ring gear 372 is disposed outside the second level planetary gear 371. The second level wheel axle 373 is disposed at a center of the second planetary gear 371 and can allow the second planetary gear 371 to rotate about the second level wheel axle 373, meanwhile, in the first central wheel 344 is further provided a shaft bore into which a front end of the second level wheel axle 373 is inserted. Therefore, the second level wheel axle 373 can move back and forth in the shaft bore of the first central wheel 344 in the direction of the first axis, i.e., the first central wheel 344 is equivalent to the planetary gear carrier of the second planetary gear train from perspective of function.

The torsion output tool of the illustrated embodiment further comprises a gearbox housing 380 and a function converting ring 390 that drive the transmission assembly 300 to switch to achieve the drilling mode and the impact mode. Specifically, the gearbox housing 380 is disposed in the housing 100 and positioned fixedly relative to the housing 100, and two slides 381 are slidably connected to both sides of an outer periphery of the gearbox housing 380 in the direction of the first axis. Each slide 381 is provided with a pin hole 381a, and a connecting pin is provided between each slide 381 and a rear end of the link 361. One end of the connecting pin passes through the pin hole 381a on the slide 381, and the other end thereof passes through a connecting hole 361b disposed at the rear end of the link 361 to achieve connection of the link 361 and the slides 381 so that the link 361 can move along with the slides 381. The function converting ring 390 can rotate about the first axis relative to the gearbox housing 380, and the function converting ring 390 has a segment of a cylindrical wall surface. Two slant bores 391 are disposed on both sides of the cylindrical wall surface, and the connecting pin passes through the slant bore 391. Each slant bore 391 comprises two segments of parallel rails perpendicular to the direction of the first axis and a segment of a push-pull rail between the two segments of parallel rails, and the push-pull rail has a certain inclination angle relative to the parallel rails. As such, when the function converting ring 390 rotates relative to the gearbox housing 380, the push-pull rail can limit the connecting pin respectively passing therethrough so that the connecting pin moves in the direction of the first axis. Noticeably here, the push-pull rails in the two slant bores 391 are inclined at the same angle, but they are inclined in opposite directions so that the connecting pins passing therethrough respectively can simultaneously slide back and forth in the direction of the first axis.

To achieve movement of the first central wheel 344 between the first position and the second position, an inner annular slot 344d is further provided on the outer periphery of the wheel disk 344c of the first central wheel 344, and a driving structure is disposed or formed on an inner side of the slide 381 facing towards the gearbox housing 380. The driving structure may be a protrusion protruding inwardly, and the gearbox housing 380 is provided with a through hole allowing the protrusion to pass therethrough and slide therein so that the protrusion can be embedded in the inner annular slot 344d on the wheel disk 344c such that, due to action of the driving structure and the connecting pins, the first central wheel 344 moves in the direction of the first axis, and due to the linkage action of the links 361, the first central wheel 344 and the locking member 350 can simultaneously move to the first position and the second position so as to achieve the drilling mode and the impact mode. Meanwhile, in order to switch the drilling mode and the impact mode of the torsion output tool, a knob 392 enabling the function converting ring 380 to rotate circumferentially is disposed on the function converting ring 390.

In the illustrated embodiment, the first central wheel 344 meshes with the first level planetary gear 342 when it is at the first position, and the first central wheel 344 is directly connected with the first planetary gear carrier 420 when it is at the second position. Therefore, due to the action of the first level planetary gear 342, a transmission ratio finally transmitted to the output shaft 310 when the central wheel 344 is at the first position is greater than that finally transmitted to the output shaft 310 when the first central wheel 344 is at the second position.

In the illustrated embodiment, the torsion output tool further comprises a torque control assembly. The torque control assembly can lock or release the first inner ring gear 343 according to a load on the first inner ring gear 343 so that the first inner ring gear 343 is circumferentially stationary relative to the housing 100 to allow the first planetary gear carrier 341 to rotate relative to the housing 100. Specifically, the torque control assembly comprises a threaded ring 410, a bracket 420, a plurality of compression springs 430, a front cover 440, a mounting ring 450, a washer 460 and a locking assembly. The threaded ring 410 is fitted around the front cover 440, a front end of the front cover 440 is provided with an external thread, and an interior of the threaded ring 410 is provided with an internal thread mating with the external thread. The threaded ring 420 can move back and forth on the front cover 440 in the direction of the first axis due to the mating action of the external thread and the internal thread. The bracket 420 is also sleeved around the front cover 440 and is located at the rear of the threaded ring 410. The bracket 420 is further provided with a plurality of supporting posts 421, and the compression springs 430 are correspondingly sleeved around the supporting posts 421.

Meanwhile, in order to guide the movement of the bracket 420 on the front cover 440, the front cover 440 is further provided with a plurality of receiving through holes for guiding the supporting posts 421 and the compression springs 430. Therefore, driven by the threaded ring 410 and due to the guiding action of the receiving through holes, the bracket 420 can move in the direction of the first axis. In addition, one end of the compression spring 430 abuts against the supporting post 421, and the other end thereof abuts against the washer 460. The washer 460 is disposed on a rear side of the front cover 440, and the mounting ring 450 is disposed on a rear side of the washer 460. A plurality of mounting through holes are provided in the mounting ring 450, and the mounting through holes are used to mount the locking assembly. The locking assembly comprises a locking ball 471 and a locking pillar 472, a front end of the locking pillar 472 directly abuts against the washer 460, and a rear end thereof abuts against one side of the locking ball 471. The other end of the locking ball 471 contacts with a stopping disc disposed on the first inner ring gear 343, meanwhile the stopping disc is further provided with a plurality of stopping protuberances 343a which protrude forward from a circumferential direction of the stopping disc in the direction of the first axis such that the other side of the locking ball 471 abuts against the stopping protuberances 343a on the stopping disc. Hence, due to the action of the threaded ring 410, the bracket 420 may move back and forth on the front cover 440 in the direction of the first axis; when the bracket 420 moves backward, one end of the compression springs 430 sleeved thereon abuts against the supporting post 421, and the other end abuts against the washer 460, and the compression springs 430 press the washer 460. Then, the washer 460 begins to press the locking pillars 473 and the locking balls 471, the locking balls 471 press the stopping disc, and the stopping disc, pressed by the locking balls 471, enables the first inner ring gear 343 in a stationary state, i.e., locks the first inner ring gear 343; when the bracket 420 moves forward, the first inner ring gear 343 is released. Additionally, in order to facilitate movement of the threaded ring 410 on the front cover 440, a torsion cup 480 for facilitating torsion is further provided outside the threaded ring 410 and the front cover 440.

As further illustrated, the function converting ring 390 begins to rotate circumferentially when the knob 392 is turned, and when the function converting ring 390 rotates counter clockwise, the connecting pin moves forward along the first axis due to the action of the push-pull rail in the slant bore 391, and the slide 381 and the link 361 also move forward together due to the action of the connecting pin. As such, due to the action of the driving structure disposed on the slide 381, the first central wheel 344 moves forward to the first position, and meanwhile the locking member 350 also moves forward and locks the relative circumferential positions of the output shaft 310 and the first planetary gear carrier 341 so as to achieve the drilling mode. Likewise, when the knob 392 is turned in an opposite direction, the function converting ring 390 rotate clockwise so as to finally achieve the impact mode.

Figure 7:
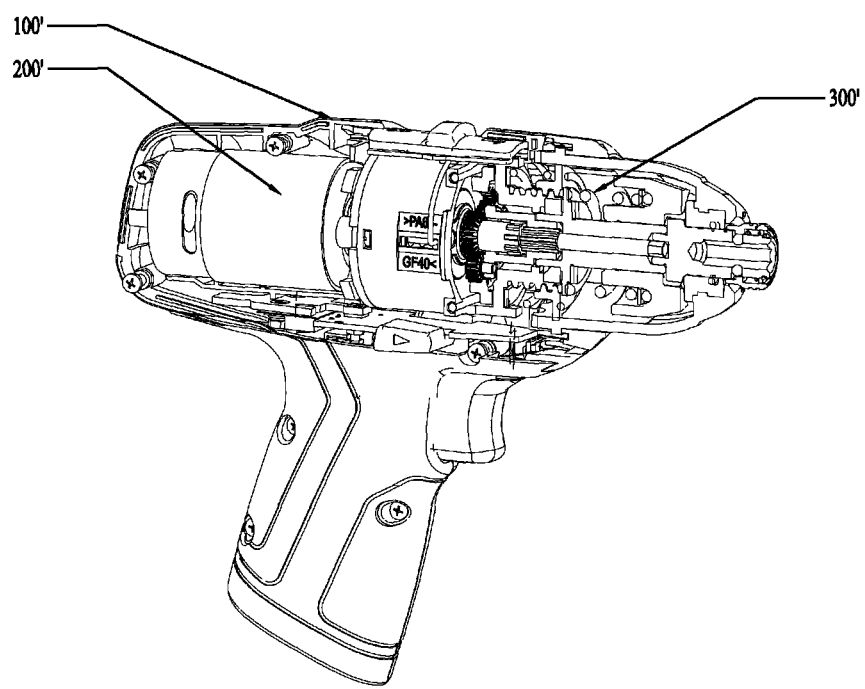
FIG. 7 is a further structural schematic view of an exemplary torsion output tool constructed according to the description which follows.
Figure 8:
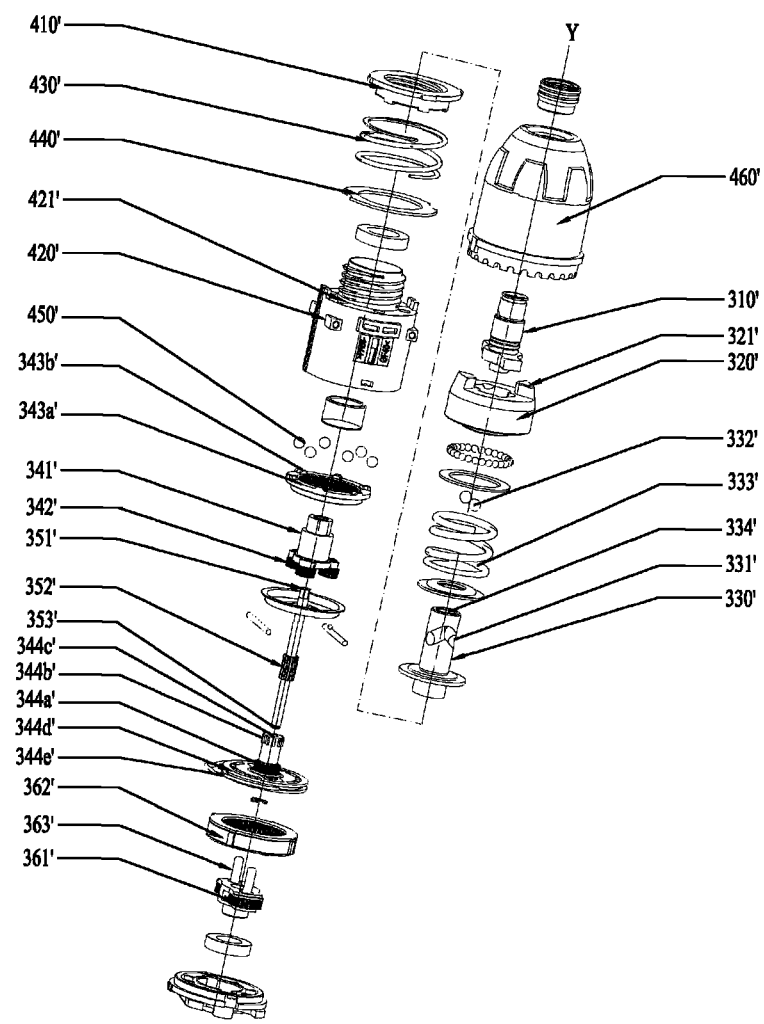
FIG. 8 is an exploded view of a part of the tool of FIG. 7.

Turning to FIG. 7, the torsion output tool may also comprise a housing 100', a motor 200' and a transmission assembly 300', wherein the housing 100' forms a receiving space for receiving the motor 200' and the transmission assembly 300', the motor 200' is disposed in the receiving space formed by the housing 100' and configured to provide the torsion output tool with desired power upon operation, and the transmission assembly 300' is driven by the motor 200' and configured to output power generated by the motor 200'.

Referring to FIGS. 7 through 10, the transmission assembly 300' comprises an output shaft 310', a hammer body 320', a main shaft 330', a first planetary gear train, a locking member 350' and a second planetary gear train.

Specifically, the output shaft 310' is used to finally output a torque, with one end connected with various drill bits to adapt for different demands. In the illustrated embodiment, the other end of the output shaft 310' opposite to the end connected with the drill bit is provided with a pair of hammer anvils 311', the end of the output shaft 310' provided with the hammer anvils 311' is further provided with a locking slot 312', and the output shaft 310' may rotate about an axis on which its own center falls. The axis of the output shaft 310' on which its own center falls is defined here as a first axis, namely axis Y' in FIGS. 8 through 10, a circumferential direction about the first axis is a circumferential direction, a direction facing towards the end of the output shaft 310' connected with the drill bit is defined as the front, a direction facing towards the other end of the output shaft 310' provided with the hammer anvils 311' is defined as the rear, and the front and rear as stated here are only intended to facilitate a clear description of the technical solution of the illustrated embodiment and, as such, is not to be regarded as limiting the scope of the invention hereinafter claimed.

The hammer body 320' is disposed proximate to the end of the output shaft 310' provided with the hammer anvils 311', and a front end of the hammer body 320' is provided with a pair of hammer blocks 321' cooperating with the hammer anvils 311' on the output shaft 310'. An interior of the hammer body 320' is further provided with a through hole allowing the main shaft 330' to pass therethrough, and the main shaft 330' and the hammer body 320' are respectively provided with two segments of semi-spherical slots 331'. Between the semi-spherical slots 331' is provided a ball 332' freely slideable therein, and a segment of spring 333' is disposed between the main shaft 330' and the hammer body 320'. Due to the cooperative action of the semi-spherical slots 331', the ball 332' and the spring 333', the main shaft 330' is enabled to drive the hammer body 320' to move reciprocally along the first axis while rotating about the first axis so as to drive the output shaft 310' in an impact manner. How the semi-spherical slots 331', the ball 332' and the spring 333' cooperate to enable the main shaft 330' to drive the hammer body 320' to drive the output shaft 310' in an impact manner is well known to those of skill in the art and, as such, need not be described further herein.

Figure 9:
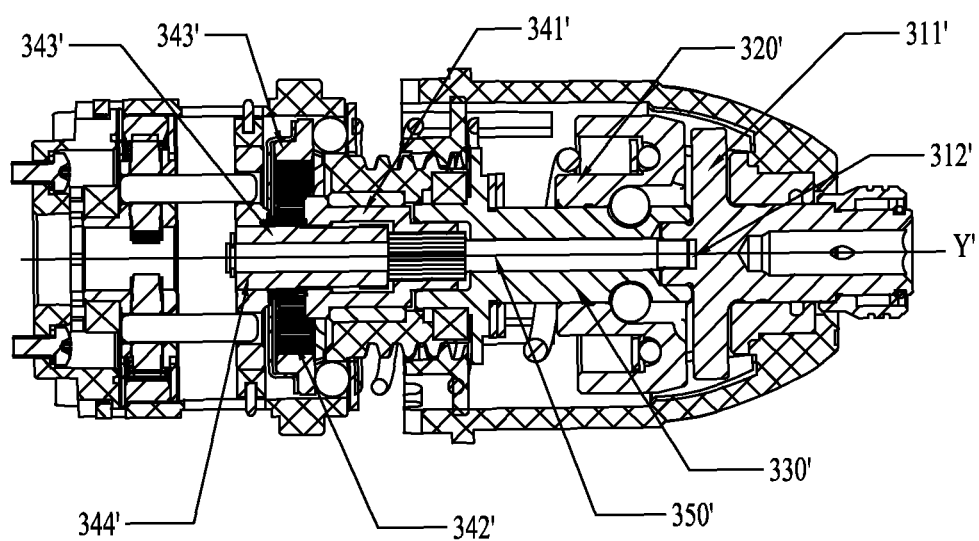
FIG. 9 is a sectional view of a part of the tool of FIG. 7, wherein a first central wheel is at a first position.
Figure 10:
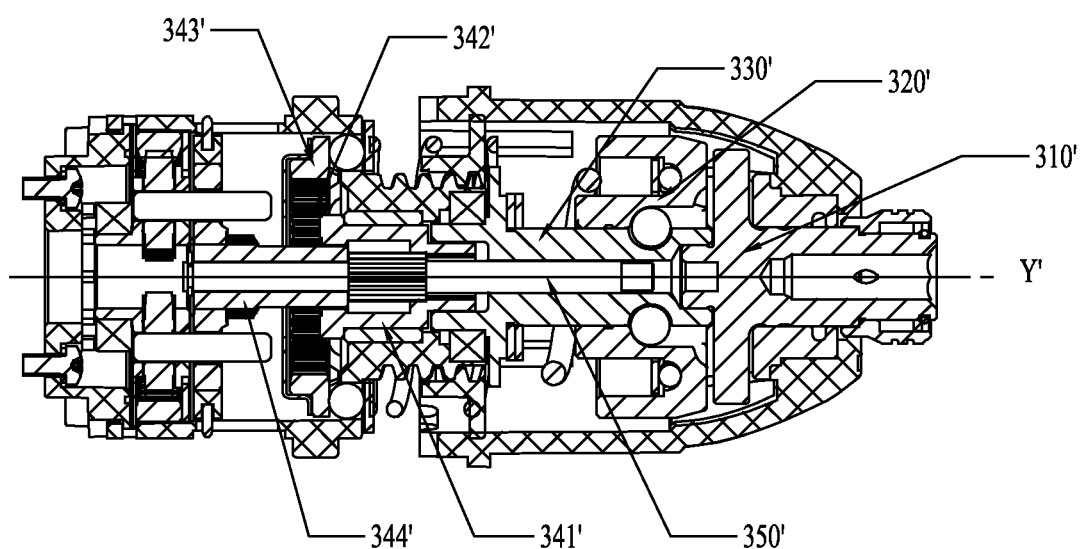
FIG. 10 is a sectional view of a part of the tool of FIG. 7, wherein a first central wheel is at a second position.

The first planetary gear train comprises a first planetary gear carrier 341', a first level planetary gear 342', a first inner ring gear 343' and a first central wheel 344'. The relative positions of the first planetary gear carrier 341', the first level planetary gear 342' and the first inner ring gear 343' in the direction of the first axis are fixed, and the first central wheel 344' can slide in the direction of the first axis to a first position and a second position, i.e., the first planetary gear carrier 341', the first level planetary gear 342' and the first inner ring gear 343' cannot slide in the direction of the first axis whereas the first central wheel 344' may slide in the direction of the first axis. The first position here is a position where the first central wheel 344' in FIG. 9 is located, and the second position is a position where the first central wheel 344' in FIG. 10 is located.

The first planetary gear carrier 341' is rotatably disposed in the housing 100' and fixed with the main shaft 330' into one piece to achieve constant synchronous rotation with the main shaft 330', and the first planetary gear carrier 341' may be press fitted with the main shaft 330', for example, by providing a magnitude of interference between the first planetary gear carrier 341' and the main shaft 330' so that the components may be press-fit together into one piece by means of interference fitting. Certainly, it may be appreciated that the first planetary gear carrier 341' and the main shaft 330' may be connected by a connector, and connection manners that can achieve constant synchronous rotation are all intended to fall within the protection scope of the invention hereinafter claimed. A slide hole is disposed in an interior of the first planetary gear carrier 341', an inner circumferential structure is disposed in an interior of the slide hole, and the inner circumferential structure enables the first central wheel 344' to engage with the first planetary gear carrier 341' and enables the first planetary gear carrier 341' to rotate synchronously with the first central wheel 344' upon engagement.

In the illustrated embodiment, the first planetary gear train comprises a plurality of first level planetary gears 342' which are rotatably connected to a rear end of the first planetary gear carrier 341'. The inner ring gear 343' is disposed outside the plurality of first level planetary gears 342' and forms a meshed engagement with the first level planetary gears 342'. The first inner ring gear 343' is further circumferentially provided with a transmission position that is stationary relative to the housing 100', and the first planetary gear carrier 341' can be allowed to rotate relative to the housing 100' when the first inner ring gear 343' is stationary.

The first central wheel 344' comprises a first central gear 344a', an outer circumferential structure 344b', a central through hole 344c' and a wheel disc 344d'. The first central gear 344a' is disposed at a rear end of the first central wheel 344'. When the first central wheel 344' is located at the first position as shown in FIG. 9, the first central gear 344a' at the rear end thereof will move to the first level planetary gear 342' and meshes with the first level planetary gear 342' while the outer circumferential structure 344b' is disposed at an outer circumference of the first central wheel 344' and located at a relatively forward position relative to the position of the first central gear 344a' on the first central wheel 344'. As such, when the first central wheel 344' is located at the second position as shown in FIG. 10, the front end of the first central wheel 344' slides into the slide hole on the first planetary gear carrier 341', the outer circumferential structure 344b' of the first central wheel 344' moves to the location of the inner circumferential structure in the interior of the slide hole and forms an engagement with the inner circumferential structure to drive the first planetary gear carrier 341' to rotate along with the first central wheel 344'. In the illustrated embodiment, the inner circumferential structure and the outer circumferential structure 344b' are mutually engageable splines. Certainly, other engagement manners may be employed to achieve rotation of the first planetary gear carrier 341' along with the first central wheel 344'. The central through hole 344c' is disposed in the first central wheel 344' and it may receive a partial locking member 350'. The wheel disc 344d' is disposed at the end of the first central wheel 344' provided with the first central gear 344a'.

In the illustrated embodiment, the first central wheel 344' meshes with the first level planetary gear 342' when it is at the first position, and the first central wheel 344' is directly connected with the first planetary gear carrier when at the second position. Therefore, due to the action of the first level planetary gear 342', a transmission ratio finally transmitted to the output shaft 310' when the first central wheel 344' is at the first position is greater than that finally transmitted to the output shaft 310' when the first central wheel 344' is at the second position.

The locking member 350' comprises a rod structure which can be partly received in a receiving through hole 334' disposed in the main shaft 330'. A front end of the rod structure is provided with a locking end 351' and the locking member 350' and the output shaft 310' can achieve synchronous rotation when the locking end 351' is embedded in a locking slot 312' in the main shaft 330'. In the illustrated embodiment, the locking end 351' may be a hexagonal structure, and the structure of the locking slot 312' is a corresponding structure mating with the hexagonal structure. An outer transmission structure 352' is further provided outside the locking member 350', and correspondingly, an inner transmission structure mating with the outer transmission structure 352' is provided in the interior of the slide hole of the first planetary gear carrier 341'. In the illustrated embodiment, the outer transmission structure 352' is a guide block disposed on the outer circumference of the locking member 350' and protruding outwardly, and the inner transmission structure is a guide slot disposed in the interior of the first planetary gear carrier 341'. The engagement of the outer transmission structure 352' and the inner transmission structure can not only enable the locking member 350' and the first planetary gear carrier 341' to constitute sliding connection in the direction of the first axis to guide and slide the locking member 350', but also can enable the locking member 350' and the planetary gear carrier 341' to always rotate synchronously to achieve torque transmission.

The locking member 350' is further partly received in the central through hole 344c' in the interior of the first central wheel 344' and can rotate in the central through hole 344c'. The locking member 350' is provided with an axis limiting structure 353' at both ends of the central through hole 344c' so that the locking member 350' can slide in the direction of the first axis synchronous with the first central wheel 344', i.e., when the first central wheel 344' is at the first position shown in FIG. 9, the locking member 350' is located at the position of the locking member 350' as shown in FIG. 9, and when the first central wheel 344' is located at the second position as shown in FIG. 10, the locking member 350' is located at the position of the locking member 350' as shown in FIG. 10. When the locking member 350' is located at the position as shown in FIG. 9, the locking end 351' of the locking member 350' is embedded in the locking slot 312' of the output shaft 310', whereupon the locking member 350' only locks the relative circumferential positions of the output shaft 310' and the first planetary gear carrier 341' so that the output shaft 310' may rotate about the first axis along with the locking member 350' and also along with the first planetary gear carrier 341' so as to achieve a drilling mode of the torsion output tool. When the locking member 350' is located at the position as shown in FIG. 10, the locking member 350' only forms a circumferential engagement with the first planetary gear carrier 341 without locking the output shaft 310', whereupon the main shaft 330' connected with the first planetary gear carrier 341' drives the hammer body 320' to move reciprocally in the direction of the first axis while rotating about its own axis so that the hammer body 320' rotating about its own axis and moving reciprocally in the direction of the first axis may intermittently impact the output shaft 310' so as to achieve an impact mode of the torsion output tool. Noticeably here, when the locking member 350' is located at the position as shown in FIG. 10, it cannot lock the output shaft 310', but it still can rotate synchronously with the first planter gear carrier 341' as it is located at the position as shown in FIG. 9.

The second planetary gear train is disposed between the motor 200' and the first central wheel 344'. The second planetary gear train comprises a second central gear, a second level planetary gear 361', a second inner ring gear 362' and a second level wheel axle 363'. The second central gear is mounted on a rotation shaft disposed on the motor 200', the second level planetary gear 361' and the second central gear form meshed engagement, and the second inner ring gear 362' is disposed outside the second level planetary gear 361'. The second level wheel axle 363' is disposed at a center of the second planetary gear 361' and can allow the second planetary gear 361' to rotate about the second level wheel axle 363'. Meanwhile, in the first central wheel 344' is further provided a shaft bore into which a front end of the second level wheel axle 363' is inserted. Therefore, the second level wheel axle 363' can move back and forth in the shaft bore of the first central wheel 344' in the direction of the first axis, i.e., the first central wheel 344' is equivalent to the planetary gear carrier of the second planetary gear train from perspective of function.

In the illustrated embodiment, the torsion output tool further comprises a torque control assembly. The torque control assembly can lock or release the first inner ring gear 343' according to a load on the first inner ring gear 343' so that the first inner ring gear 343' is circumferentially stationary relative to the housing 100' to allow the first planetary gear carrier 341' to rotate relative to the housing 100'. Specifically, the torque control assembly comprises a threaded ring 410', a gearbox 420', a compression spring 430', a retainer ring 440' and locking members 450'. The threaded ring 410' is fitted around the gearbox 420', a front end of the gearbox 420' is provided with an external thread, and correspondingly, an interior of the threaded ring 410' is provided with an internal thread mating with the external thread, and the threaded ring 410' can move back and forth on the gearbox 420' in the direction of the first axis due to the mating action of the external thread and the internal thread. The retainer ring 440' is also sleeved around the gearbox 420' and located in the rear of the threaded ring 410'. The compression spring 430' is disposed between the threaded ring 410' and the retainer ring 440', one end of the compression spring 430' abuts against the rear end of the threaded ring 410', and the other end of the compression spring 430' abuts against the retainer ring 440'. Meanwhile, in order to receive the locking members 450', the gearbox 420' is further provided with a receiving through hole 421' for receiving the locking members 450'. In the illustrated embodiment, the locking members 450' are locking balls, with one end thereof directly contacting the retainer ring 440' and the other end thereof contacting a stopping disc 343a' on the first inner ring gear 343'. The stopping disc 343a' is further provided with stopping protuberances 343b', and the stopping protuberances 343b' are arranged in a circumferential direction of the stopping disc 343a' and protrude in the direction of the first axis. Hence, when the threaded ring 410' moves rearward, the compression spring 430' on the gearbox 420' is pressed, and the pressed compression spring 430' presses the retainer ring 440'. Then, the retainer ring 440' begins to press the locking balls, the locking balls press the stopping disc 343a', and the stopping disc 343a', pressed by the locking balls, enables the first inner ring gear 343' in a stationary state, i.e., locks the first inner ring gear 343'. When the threaded ring 410' moves forward, the first inner ring gear 343' is released. Additionally, in order to facilitate the movement of the threaded ring 410' on gearbox 420', a torsion cup 460' for facilitating torsion is further provided outside the threaded ring 410' and the gearbox 420'.

In the illustrated embodiment, in order to switch the drilling mode and the impact mode of the torsion output tool, a function switching lever 344e' is provided on the wheel disc 344d' of the first central wheel 344'. When the function switching lever 344e' is moved in different directions, the first central wheel 344' is enabled to switch to be at the first position and the second position, and meanwhile, the locking member 350' is forced to slide back and forth to achieve the switching of the drilling mode and the impact mode.

In the illustrated embodiment, when the function switching lever 344e' is moved in a positive direction, the first central wheel 344' moves forward to the first position, and meanwhile the locking member 350' also moves forward so that its locking end 351' is embedded into the output shaft 310' to lock the relative circumferential positions of the output shaft 310' and the first planetary gear carrier 341' so as to achieve the drilling mode. Likewise, when the function switching lever 344e' is moved inversely, the impact mode can be achieved.

What is claimed is:

1. A torsion output tool, comprising:
a housing;
a transmission assembly; and
a motor for driving the transmission assembly;
wherein the transmission assembly comprises:
an output shaft rotatable about a first axis;
a hammer body configured to move in a reciprocating manner in a direction of the first axis while rotating about the first axis;
a main shaft for driving the hammer body;
a first planetary gear train for driving the main shaft; and
a locking shaft;
wherein the output shaft comprises a pair of hammer anvils, the hammer body is provided with hammer blocks that cooperate with the hammer anvils, and the main shaft rotates about the first axis;
wherein the first planetary gear train comprises:
a first planetary gear carrier rotatably disposed in the housing;
a first level planetary gear rotatable relative to the first planetary gear carrier;
a first inner ring gear disposed outside the first level planetary gear and meshing with the first level planetary gear; and
a first central wheel capable of sliding in the direction of the first axis to a first position and a second position;
wherein the first planetary gear carrier rotates synchronously with the main shaft;
wherein the first planetary gear carrier, the first level planetary gear and the first inner ring gear are fixedly positioned in the direction of the first axis relative to each other, the first planetary gear carrier is provided with a slide hole in which an inner circumferential structure is disposed, the first inner ring gear has at least a transmission position in a circumferential direction where the first inner ring gear is stationary relative to the housing so that the first planetary gear carrier rotates relative to the housing;

wherein the first central wheel comprises:
a first central gear meshing with the first level planetary gear when the first central wheel is at the first position; and
an outer circumferential structure extending into the slide hole and mating with the inner circumferential structure when the first central wheel is at the second position; and
wherein a locking member is configured to slide synchronously with the first central wheel and rotate synchronously with the first planetary gear carrier such that, when the first central wheel is at the first position, the locking member locks the relative circumferential positions of the output shaft and the first planetary gear carrier and, when the first central wheel is at the second position, the locking member unlocks the relative circumferential positions of the output shaft and the first planetary gear carrier.

2. The torsion output tool according to claim 1, wherein the locking member at least comprises a sleeve structure for receiving the hammer body, and a front end of the sleeve structure is provided with a locking protrusion protruding forward in the direction of the first axis and extending forward to a position between the hammer anvils when the first central wheel is at the first position.

3. The torsion output tool according to claim 2, wherein a rear end of the locking member is, at least in an interior of the sleeve structure, formed with an inner slide rail structure enabling the locking member and the first planetary gear carrier to only constitute a sliding connection along the first axis, and the first planetary gear carrier is, at least on the outer circumference thereof, formed with an outer slide rail structure engaging with the inner slide rail structure.

4. The torsion output tool according to claim 3, wherein the inner slide rail structure comprises a guide block protruding inwardly, and the outer slide rail structure is a guide slot adapted for the guide block.

5. The torsion output tool according to claim 1, further comprising a linkage assembly, the linkage assembly being at least provided between the locking member and the first central wheel to enable the locking member and the first central wheel to move in unison in the direction of the first axis, and wherein the linkage assembly at least comprises two links, wherein a front end of each link is bent to form a stopper, and wherein an outer annular slot in which the stopper is partially embedded is provided at the outer periphery of the locking member.

6. The torsion output tool according to claim 5, further comprising a gearbox housing positioned fixedly relative to the housing, a function converting ring rotatable about the first axis relative to the gearbox housing, two slides slidably connected to both sides of the gearbox housing in the direction of the first axis, and connecting pins provided between the slides and the rear end of the links to connect the slides and the rear end of the links, wherein the function converting ring at least has a segment of a cylindrical wall surface on which at least two slant bores are provided, the two slant bores at least respectively have push-pull rails which are inclined at the same angle but positioned in opposite directions, the connecting pins pass through the slant bores, and the push-pull rails respectively limit the respective connecting pins.

7. The torsion output tool according to claim 6, wherein the first central wheel further comprises a wheel disc, and an inner annular slot is provided on the outer periphery of the wheel disk, wherein a driving structure embeddable into the inner annular slot is disposed or formed on the inner side of the slide facing towards the gearbox housing, and the gearbox housing is provided with a through hole allowing the driving structure to pass therethrough and slide therein.

8. The torsion output tool according to claim 7, wherein the torque control assembly comprises a threaded ring, a gearbox, a compression spring, a retainer ring and a locking assembly wherein a front end of the gearbox is provided with an external thread, the threaded ring is provided with an internal thread mating with the external thread, the threaded ring is mounted on the gearbox, the retainer ring is disposed on a rear side of the threaded ring, both ends of the compression spring respectively abut against the threaded ring and the retainer ring, the gearbox is provided with a receiving through hole for receiving the locking assembly; the first inner ring gear is provided with a stopping disc contacting with the locking assembly, and the stopping disc, in a circumferential direction, is provided with a plurality of stopping protuberances protruding in the direction of the first axis.

9. The torsion output tool according to claim 8, wherein the locking assembly is a locking ball to be contacted by the retainer ring.

10. The torsion output tool according to claim 1, further comprising a torque control assembly configured to lock or release the first inner ring gear according to a torque of a load on the first inner ring gear.

11. The torsion output tool according to claim 10, wherein the torque control assembly comprises a threaded ring, a bracket, a plurality of compression springs, a front cover, a mounting ring, a washer and a locking assembly wherein a front end of the front cover is provided with an external thread, the threaded ring is provided with an internal thread mating with the external thread, the threaded ring is mounted on the front cover, the bracket is provided with a plurality of supporting posts corresponding to the compression springs, the front cover is provided with a plurality of receiving through holes in which the supporting posts or the compression springs are disposed, the bracket is disposed at the rear of the threaded ring and is adapted to move in the direction of the first axis under the action of the driving of the threaded ring and the guiding of the receiving through holes, one end of each compression spring abuts against the supporting post, and the other end of each compression spring abuts against the washer, the washer is disposed on a rear side of the front cover, the mounting ring is disposed on a rear side of the washer and provided with a plurality of mounting through holes for mounting the locking assembly, the locking assembly comprises a locking ball and a locking pillar, a front end of the locking pillar directly abuts against the washer and a rear end of the locking pillar abuts against the locking ball, the first inner ring gear is provided with a stopping disc contacting with the locking ball, and the stopping disc, in a circumferential direction, is provided with a plurality of stopping protuberances protruding toward the direction of the first axis.

12. The torsion output tool according to claim 1, wherein a transmission ratio of the first central wheel to the output shaft when the first central wheel is at the first position is greater than a transmission ratio of the first central wheel to the output shaft when the first central wheel is at the second position.

13. The torsion output tool according to claim 1, wherein a rear end of the output shaft is provided with a locking slot, and the main shaft is provided with a receiving through hole, wherein the locking member at least comprises a rod structure partly received in the receiving through hole, and a front end of the rod structure is provided with a locking end that is embeddable in the locking slot when the first central wheel is at the first position so that the locking member and the output shaft rotate synchronously.

14. The torsion output tool according to claim 13, wherein an outer transmission structure is at least provided outside the locking member to enable the locking member and the first planetary gear carrier to rotate synchronously, and an inner transmission structure is at least provided in an interior of the first planetary gear carrier to mate with the outer transmission structure and guide the locking member to slide in the direction of the first axis.

15. The torsion output tool according to claim 1, wherein the first central wheel is provided with a central through hole for receiving a part of the locking member and enabling the locking member to rotate therein, and the locking member is provided with axial direction limiting structures at both ends of the central through hole.

16. The torsion output tool according to claim 1, wherein the transmission assembly further comprises a second planetary gear train, and the second planetary gear train comprises a second central gear mounted on a rotation shaft of the motor, a second level planetary gear meshing with the second central gear, and a second inner ring gear disposed outside the second level planetary gear and meshing with the second level planetary gear.

17. The torsion output tool according to claim 16, wherein the second planetary gear train further comprises a second level wheel axle disposed at a center of the second level planetary gear functioning as an axis to enable the second level planetary gear to rotate about the second level wheel axle, and the first central wheel is provided with a shaft hole allowing a front end of the second level wheel axle to be inserted in the first central wheel and to move in the direction of the first axis.

18. The torsion output tool according to claim 1, further comprising a torque control assembly configured to lock or release the first inner ring gear according to a torque of a load on the first inner ring gear.

* * * * *